(12) United States Patent
Yang et al.

(10) Patent No.: US 12,320,823 B2
(45) Date of Patent: Jun. 3, 2025

(54) MOLTEN-STATE SUSPENDED ELLIPSOIDAL DROPLET IMAGE PROCESSING ALGORITHM BASED ON DUAL-CAMERA VISION

(71) Applicant: SHANGHAI INSTITUTE OF CERAMICS, CHINESE ACADEMY OF SCIENCES, Shanghai (CN)

(72) Inventors: Liping Yang, Shanghai (CN); Qiu Zhong, Shanghai (CN); Huidong Li, Shanghai (CN); Ye Tao, Shanghai (CN)

(73) Assignee: SHANGHAI INSTITUTE OF CERAMICS, CHINESE ACADEMY OF SCIENCES, Shanghai (CN)

( * ) Notice: Subject to any disclaimer, the term of this patent is extended or adjusted under 35 U.S.C. 154(b) by 351 days.

(21) Appl. No.: 17/995,570

(22) PCT Filed: Apr. 9, 2021

(86) PCT No.: PCT/CN2021/000076
§ 371 (c)(1),
(2) Date: Oct. 5, 2022

(87) PCT Pub. No.: WO2021/203773
PCT Pub. Date: Oct. 14, 2021

(65) Prior Publication Data
US 2023/0160799 A1 May 25, 2023

(30) Foreign Application Priority Data
Apr. 10, 2020 (CN) .......................... 202010277956.1

(51) Int. Cl.
*G06T 7/00* (2017.01)
*G01N 9/04* (2006.01)
(Continued)

(52) U.S. Cl.
CPC ................. *G01N 9/04* (2013.01); *G06T 7/13* (2017.01); *G06T 7/62* (2017.01); *G06V 10/28* (2022.01); *G06V 10/762* (2022.01)

(58) Field of Classification Search
CPC ... G01N 9/04; G06T 7/62; G06T 7/13; G06V 10/762; G06V 10/28
See application file for complete search history.

(56) References Cited

U.S. PATENT DOCUMENTS

2012/0027207 A1* 2/2012 Lee ........................ G06T 1/0028
380/205

OTHER PUBLICATIONS

Dupac, Mihai, Sayavur Bakhtiyarov, and Ruel A. Overfelt. "Volume Computation of a Levitated Aspherical Droplet From 2-D Image Information." ASME International Mechanical Engineering Congress and Exposition. vol. 3719. 2003. (Year: 2003).*

(Continued)

*Primary Examiner* — Oneal R Mistry
*Assistant Examiner* — Nhut Huy Pham
(74) *Attorney, Agent, or Firm* — Alleman Hall & Tuttle LLP

(57) ABSTRACT

A molten-state suspended ellipsoidal droplet image processing algorithm is based on dual-camera vision. The algorithm includes acquiring images of a standard sphere by means of two cameras, and calculating the actual size corresponding to each individual pixel of the two standard sphere images; synchronously acquiring two images of a droplet by using the two cameras at a specified included angle; establishing an ellipsoidal quadric surface equation for the droplet, respectively detecting edge contour lines of the two images, and establishing elliptical contour line equations for the edge contour lines; introducing a specified included angle, and constructing an equation set according to relationships between parameters of the two elliptical contour line equations and the ellipsoidal quadric surface equation; solving (Continued)

the equation set to obtain the length of each semi-axis of the droplet; and calculating the volume of the droplet according to the length of each semi-axis.

4 Claims, 2 Drawing Sheets

(51) Int. Cl.
    *G06T 7/13*     (2017.01)
    *G06T 7/62*     (2017.01)
    *G06V 10/00*     (2022.01)
    *G06V 10/28*     (2022.01)
    *G06V 10/762*     (2022.01)

(56) References Cited

OTHER PUBLICATIONS

Wijewickrema, Sudanthi NR, Andrew P. Paplinski, and Charles E. Esson. "Reconstruction of ellipsoids on rollers from stereo images using occluding contours." International Conference on Computer Vision Theory and Applications. 2006. (Year: 2006).*

Pope, Stephen B. "Algorithms for ellipsoids." Cornell University Report No. FDA (2008): 08-01. (Year: 2008).*

Ozawa, Shumpei, et al. "Precise density measurement of liquid titanium by electrostatic levitator." Materials Transactions 58.12 (2017): 1664-1669. (Year: 2017).*

Dupac et al. "Volume Computation of a Levitated Aspherical Droplet From 2-D Image Information." ASME International Mechanical Engineering Congress and Exposition. vol. 3719. 2003.*

Wijewickrema et al. "Reconstruction of ellipsoids on rollers from stereo images using occluding contours." International Conference on Computer Vision Theory and Applications. 2006.*

Ozawa, Shumpei, et al. "Precise density measurement of liquid titanium by electrostatic levitator." Materials Transactions 58.12 (2017): 1664-1669., cited in IDS.*

Ozawa, S. et al., "Precise Density Measurement of Liquid Titanium by Electrostatic Levitator," Materials Transactions, vol. 58, No. 12, 2017, 6 pages.

Bian Y. et al., "Dynamic Characteristics of Bubble in Air-Water System Based on 3D Ellipsoid Model," Chinese Master's Theses Full-text Database, Basic Science, vol. 4, 2014, 25 pages. Submitted with English abstract.

* cited by examiner

IM1          IM1 CONTOUR LINE

IM2          IM2 CONTOUR LINE

MOLTEN-STATE SUSPENDED ELLIPSOIDAL DROPLET IMAGE PROCESSING ALGORITHM BASED ON DUAL-CAMERA VISION

TECHNICAL FIELD

The present invention relates to the field of liquid-state sample image processing under a containerless method, and in particular, to a molten-state suspended ellipsoidal droplet image processing algorithm based on dual-camera vision.

BACKGROUND

As an important branch in the field of space science and application, material science in space is an extension of traditional material science to the environment of space and one of the most active frontier interdisciplines in the development of new theories of material science, the exploration of material preparation technology and the development of new fields of material application. Space has special conditions, such as microgravity, ultra-vacuum, containerless, and strong radiation, which are ideal experimental conditions for the study of melting, solidification, and so on of materials. However, space resources which people can use so far are still very limited. Therefore, ground methods of simulating the various effects in the space environment come into being. The suspension technique is one of them, which can simulate the containerless state in the space environment. In the suspension technique, the measurement of the density of a suspended droplet is the most effective way to obtain density data of a liquid material. In the measurement of density, the liquid sample in the containerless state shrinks into a sphere under the effect of the surface tension of the droplet itself. Therefore, the diameter of the sample can be obtained by capturing a sample image with cameras, then the volume of the sample can be obtained, and finally, the density of the sample can be obtained according to a sample mass measurement result.

However, during the suspension of the sample, the sample will inevitably rotate due to the influence of nonuniform acting forces such as suspension force and laser light pressure. Under the action of rotation, the liquid sample is affected by centrifugal force, leading to the change of the sample morphology from a sphere into an ellipsoid. Moreover, because the sample surface is smooth, the suspension posture of the ellipsoid cannot be judged, and it is difficult to obtain the volume of the sample by obtaining the three-dimensional information of an image by the conventional dual-camera vision method, affecting the accuracy of obtaining density by an ellipsoidal sample image.

SUMMARY

Problems to be Solved by the Present Invention

In view of the aforementioned problems, the objective of the present invention is to provide a molten-state suspended ellipsoidal droplet image processing algorithm based on dual-camera vision which can improve the accuracy of measurement in the containerless technology.

Technical Means for Solving the Problems

The present invention provides a molten-state suspended ellipsoidal droplet image processing algorithm based on dual-camera vision, including the following steps:

(1) acquiring standard sphere images of a standard sphere by means of two cameras, and calculating an actual size corresponding to each individual pixel of the two camera images according to the acquired standard sphere images;

(2) synchronously acquiring images of a droplet by using the two cameras making a specified included angle to obtain two images of the droplet;

(3) establishing an ellipsoidal quadric surface equation for the droplet, respectively detecting edge contour lines of the two images, and establishing elliptical contour line equations of the edge contour lines;

(4) introducing the specified included angle, and constructing an equation set according to relationships between parameters of the two elliptical contour line equations and the ellipsoidal quadric surface equation;

(5) solving the equation set, and calculating the length of each semi-axis of the droplet; and (6) calculating the volume of the droplet according to the length of each semi-axis.

According to the present invention, the images of the droplet shaped like a rotating ellipsoid are synchronously acquired by using the two cameras, and the contour line equation set is established according to the two images, and is solved to obtain the major and minor axes of the droplet, so that the volume of the droplet is obtained. Thus, the three-dimensional information of a molten-state suspended droplet can still be accurately obtained even though its surface is smooth and it is difficult to judge its axis of rotation, and therefore the volume of the droplet can be accurately calculated.

Optionally, in the present invention, step (3) includes: constructing an ellipsoidal quadric surface equation for the droplet by using a symmetric positive definite matrix; binarizing each image by adopting a threshold method, detecting an edge contour line of each image by an edge detection algorithm, and constructing an elliptical contour line equation for each edge contour line; regarding each image as an image on a respective y-z plane, and extracting a coordinate set of each point on each edge contour line; and obtaining an estimated value of each parameter in each elliptical contour line equation by adopting the least squares method.

Optionally, in the present invention, in step (3), after detecting an edge contour line of each image, the center of each edge contour line is located at the center of the corresponding image. Thus, the elliptical contour line equations can be simplified to reduce the computational load.

Optionally, in the present invention, in step (5), an optimal solution of each parameter in the equation set is obtained by adopting the iteration method, and the length of each semi-axis of the droplet is calculated by the symmetric positive definite matrix.

Optionally, in the present invention, the droplet is formed in the shape of a rotating ellipsoid, and in step (6), all the semi-axes are classified into first semi-axes and second semi-axes by using a cluster analysis algorithm, and respective mean values of the first semi-axes and the second semi-axes are calculated.

Optionally, in the present invention, the droplet is measured respectively before and after the experiment, and a mean mass value is calculated and taken as the mass of the droplet; and the density of the droplet is calculated according to the volume and mass of the droplet. Thus, the influence of mass change caused by volatilization during the melting of the sample on a density measurement result can be decreased.

Effect of the Present Invention

The present invention can increase the accuracy of measurement of a molten-state suspended droplet in the containerless technology, improve the reliability and accuracy of calculation of the volume of an ellipsoidal sample, and provide accurate data support for the research of liquid materials.

DESCRIPTION OF REFERENCE NUMERALS

1. Droplet; 2. Upper electrode; 3. Lower electrode; 4. First camera; 5. Second camera; 6. First background light source; 7. Second background light source.

DETAILED DESCRIPTION OF PREFERRED EMBODIMENTS

The present invention will be further illustrated with reference to the accompanying drawings and the following embodiments below, and it should be understood that the accompanying drawings and the following embodiments are only used to illustrate the present invention rather than to limit it.

A molten-state suspended ellipsoidal droplet image processing algorithm based on dual-camera vision which can improve the accuracy of density measurement in the containerless technology is disclosed here.

According to the present invention, two cameras making an included angle are used to shoot a molten-state suspended ellipsoidal droplet in the containerless technology, contour lines in camera images are extracted, an equation set is constructed to calculate the volume of the ellipsoidal droplet, and the density of the ellipsoidal droplet is further calculated.

Figure 1:
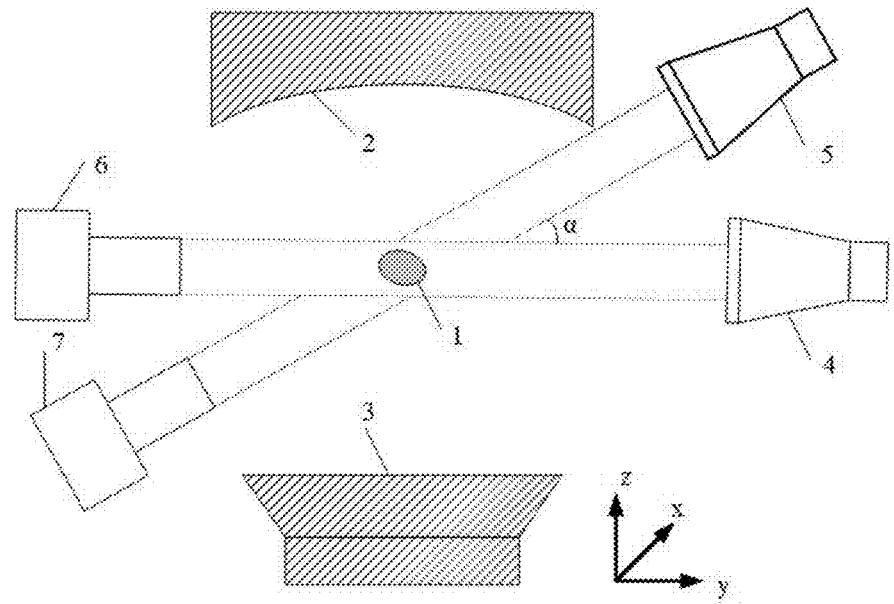
FIG. 1 is a schematic diagram of containerless suspension and imaging systems for a molten-state suspended ellipsoidal droplet image processing algorithm based on dual-camera vision according to an embodiment of the present invention.

FIG. 1 is a schematic diagram of containerless suspension and imaging systems for the molten-state suspended ellipsoidal droplet image processing algorithm based on dual-camera vision according to an embodiment of the present invention. As shown in FIG. 1, in this embodiment, the suspension system adopts an electrostatic suspension containerless method, and is mainly composed of an upper electrode 2, and a lower electrode 3 as well as a laser and a thermometer not shown. The upper electrode 2 and the lower electrode 3 may be high-voltage parallel electrode plates, and a generated high-voltage electric field enables the charged sample to counteract its own gravity under the action of Coulombian force to suspend. After the sample is stably suspended, the sample is heated by using the laser (not shown), the temperature of the sample is acquired by the thermometer (not shown), and thereby a molten-state droplet 1 is formed. The droplet 1 rotates in any posture under the action of suspension force, laser light pressure, etc., and under the action of rotation, the droplet 1 is subjected to centrifugal force to change from a sphere into an ellipsoid, specifically a rotating ellipsoid.

The imaging system is mainly composed of two sets of imaging devices: a first camera 4 and a corresponding first background light source 6, and a second camera 5 and a corresponding second background light source 7. The first camera 4 and the second camera 5 may be, for example, charged-coupled device (CCD) cameras, which are located on any plane and make an included angle α between them, and the first camera 4 and the second camera 5 are mainly used to acquire the images of the droplet 1 from different angles. Since the droplet 1 emits light in the molten state, the first background light source 6 and the second background light source 7 are mainly used to decrease the influence of the light emission of the droplet 1 itself, so that the corresponding cameras can acquire clear images.

Figure 2:
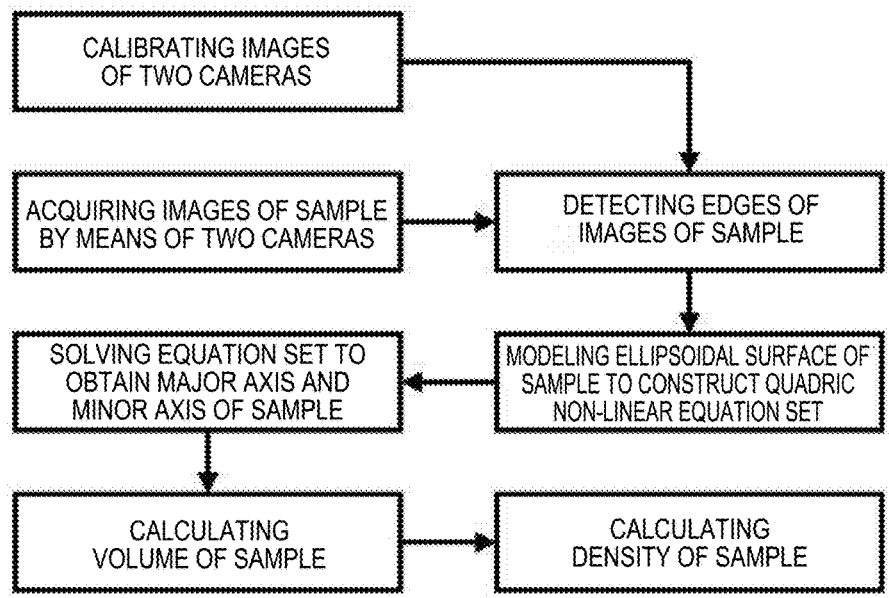
FIG. 2 is a flowchart of the molten-state suspended ellipsoidal droplet image processing algorithm based on dual-camera vision (hereinafter referred to as an image processing algorithm) according to the present invention.

FIG. 2 is a flowchart of the molten-state suspended ellipsoidal droplet image processing algorithm based on dual-camera vision according to the present invention. The main steps of the molten-state suspended ellipsoidal droplet image processing algorithm based on dual-camera vision according to the present invention will be illustrated in detail with reference to FIG. 2.

(1) Images acquired by the cameras are calibrated to determine the actual size corresponding to each individual pixel of the camera images. Specifically, images of a standard sphere (e.g., anSiC sphere) with a known diameter are acquired by using the cameras from any angle. According to the number of the diameter pixels of the standard sphere images acquired by the two cameras and the diameter of the standard sphere, the actual size corresponding to each individual pixel of the two camera images is calculated.

Figure 3:
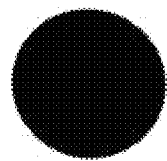
FIG. 3 is a diagram showing images acquired by two cameras making an included angle on any plane shooting a droplet and contour lines corresponding to the images of the ellipsoid obtained by edge detection.
Figure 3:
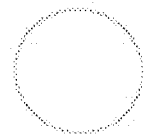
Figure 3:
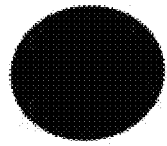
Figure 3:
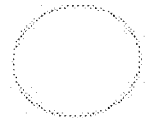

FIG. 3 is a diagram showing images acquired by the two cameras making an included angle on any plane shooting a droplet and contour lines corresponding to the images of the ellipsoid obtained by edge detection. The left side of FIG. 3 shows images of the ellipsoidal droplet acquired by the two cameras respectively, and the right side shows the contour lines of the two images which are obtained after edge detection is performed on the two images respectively.

(2) Images of a molten-state suspended ellipsoidal droplet are acquired by using the two cameras making an included angle α, the positions of which are shown in FIG. 1. Images IM1 and IM2 of the ellipsoidal droplet shown in the left side of FIG. 3 are obtained. The included angle α between the two cameras may be any angle, preferably 90°.

In addition, in step (1) and step (2), it is also possible to use only one camera to shoot the standard sphere or the droplet from two positions making the included angle α on any plane.

(3) Edge contour lines of the images IM1 and IM2 are detected, and an elliptical contour line equation for each contour line is established.

First, the images IM1 and IM2 are binarized by adopting a threshold method respectively, and the edge contour lines of the images shown in the right side of FIG. 3 are detected by an edge detection algorithm. In this embodiment, preferably, the Otsu method is adopted to calculate a threshold to binarize the images, and the Sobel algorithm is adopted to detect the edges of the binarized images to obtain the edge contour lines of the images.

Because the surface of the suspended droplet sample may be regarded as completely smooth and the axis of rotation is uncertain, the conventional dual-camera vision method cannot be used to three-dimensionally reconstruct images by extracting features, but the quadric modeling of the ellipsoid is required to obtain an ellipsoidal quadric surface equation. An ellipsoidal quadric surface is a three-dimensional positive definite quadratic form, so the ellipsoidal quadric surface equation meets formula (1): $(X-X_0)^T A(X-X_0)=1$; where A is a symmetric positive definite matrix, $X_0$ is the coordinate center, and $X=(x, y, z)^T$ is the spatial coordinates of the ellipsoid. Here, for the convenience of processing, in this embodiment, the center of the elliptical edge contour line coincides with the central position of each image, that is, the center of each edge contour line is the coordinate center of the coordinate system of each image. At this point, formula (1) is simplified into $X^T AX=1$.

Then, the images IM1 and IM2 are regarded respectively as sample images obtained by the two cameras shooting the droplet along different x axes (the included angle between the two x axes is α), that is, the images IM1 and IM2 are images on their respective y-z planes, and x of each point on the edge contour line is equal to 0, i.e. $X=(0, y, z)^T$, so that a two-dimensional elliptical contour line expression for the images can be obtained. Therefore, based on simplified formula (1), the elliptical contour line expression for the images IM1 and IM2 may be expressed $(0,y,z)^T A(0,y,z)=1$.

Since A is the symmetric positive definite matrix, it may be assumed that A is:

$$A = \begin{pmatrix} a & b & c \\ b & d & e \\ c & e & f \end{pmatrix}$$

The symmetric positive definite matrix A is substituted into formula (2), and the elliptical contour line expression is further simplified into formula (3):

$$\begin{pmatrix} y \\ z \end{pmatrix}^T \begin{pmatrix} d & e \\ e & f \end{pmatrix} \begin{pmatrix} y \\ z \end{pmatrix} = 1.$$

For the image IM1, the coordinate set $\{(Y_1, Z_1)|Y_1=(y_1, y_2, \ldots y_n)^T, Z_1=(z_1, z_2, \ldots z_n)^T\}$ of each point on the edge contour line of the image IM1 is extracted and substituted into formula (3) to obtain an elliptical contour line equation:

$d_1 Y_1^2 + 2e_1 Y_1 \cdot Z_1 + f_1 Z_1^2 = 1$

The above formula may also be expressed as formula (4):

$$\begin{pmatrix} Y_1^2 \\ Y_1 \cdot Z_1 \\ Z_1^2 \end{pmatrix}^T \begin{pmatrix} d_1 \\ 2e_1 \\ f_1 \end{pmatrix} = I_n$$

where $I_n$ is a column vector of length n and element 1.

Likewise, for the image IM2, the coordinate set $\{(Y_2, Z_2)|Y_2=(y_1, y_2, \ldots y_m)^T, Z_2=(z_1, z_2, \ldots z_m)^T\}$ of each point on the edge contour line is also extracted and substituted into formula (3) to obtain formula (5):

$$\begin{pmatrix} Y_2^2 \\ Y_2 \cdot Z_2 \\ Z_2^2 \end{pmatrix}^T \begin{pmatrix} d_2 \\ 2e_2 \\ f_2 \end{pmatrix} = I_m$$

where $I_m$ is a column vector of length m and element 1.

Then, the least squares method is adopted to estimate formula (4) and formula (5) respectively. The estimated values of the parameters $d_1$, $e_1$, $f_1$ of the elliptical contour line equation of the image IM1 are:

$$\begin{pmatrix} d_1 \\ e_1 \\ f_1 \end{pmatrix} = \left[ \begin{pmatrix} Y_1^2 \\ 2Y_1 \cdot Z_1 \\ Z_1^2 \end{pmatrix} \begin{pmatrix} Y_1^2 \\ 2Y_1 \cdot Z_1 \\ Z_1^2 \end{pmatrix}^T \right]^{-1} \begin{pmatrix} Y_1^2 \\ 2Y_1 \cdot Z_1 \\ Z_1^2 \end{pmatrix} I_n$$

The estimated values of the parameters $d_2$, $e_2$, $f_2$ of the elliptical contour line equation of the image IM2 are:

$$\begin{pmatrix} d_2 \\ e_2 \\ f_2 \end{pmatrix} = \left[ \begin{pmatrix} Y_2^2 \\ 2Y_2 \cdot Z_2 \\ Z_2^2 \end{pmatrix} \begin{pmatrix} Y_2^2 \\ 2Y_2 \cdot Z_2 \\ Z_2^2 \end{pmatrix}^T \right]^{-1} \begin{pmatrix} Y_2^2 \\ 2Y_2 \cdot Z_2 \\ Z_2^2 \end{pmatrix} I_m.$$

(4) Considering that the two cameras acquire the images of the suspended ellipsoidal droplet by making the included angle α between them, the respective planes of the images IM1 and IM2 are actually two planes making the included angle α between them, that is, the elliptical contour lines of the images IM1 and IM2 are two contour lines making the included angle α between them on the same ellipsoid. Therefore, the following relationship exists between the parameters a to f in the ellipsoidal quadric surface equation of formula (1) and the parameters $d_1$, $d_2$, $e_1$, $e_2$, $f_1$ and $f_2$ in the two elliptical contour line equations of formula (4) and formula (5):

$$\begin{cases} b - \dfrac{d^2}{4a} = d_1 \\ f - \dfrac{de}{2a} = e_1 \\ c - \dfrac{e^2}{4a} = f_1 \\ -\dfrac{d^2 - 4ab}{T} - d = d_2 \\ -\dfrac{2de\cos\alpha - 4af\cos\alpha + 4be\sin\alpha - 2df\sin\alpha}{T} = e_2 \\ -\dfrac{(e^2 - 4ac)\cos^2\alpha - 4cd\sin\alpha\cos\alpha +}{} \\ \quad -\dfrac{(f^2 - 4bc)\sin^2\alpha + ef\sin(2\alpha)}{T} = f_2 \\ T = 4 \times (a\cos^2\alpha + d\sin\alpha\cos\alpha + b\sin^2\alpha) \end{cases}$$

where T is the intermediate parameter, α is the included angle between the two cameras, and $d_1$, $d_2$, $e_1$, $e_2$, $f_1$ and $f_2$ are estimated by adopting the least squares method according to the elliptical contour line equations of the images IM1 and IM2, respectively, as described in step (3) above.

(5) The aforementioned non-linear quadratic equation set is solved by adopting the iteration method, so that optimal solutions of the parameters a to f of the quadric surface equation can be calculated, and thus a symmetric positive definite matrix A is obtained. For the symmetric positive definite matrix A, there are eigenvectors $(\lambda_1, \lambda_2, \lambda_3)$ and a 3×3 eigenmatrix R, so that the following formula holds:

$$R^T AR = \begin{bmatrix} \lambda_1 & & \\ & \lambda_2 & \\ & & \lambda_3 \end{bmatrix}$$

Thus, the lengths of the three semi-axes of the ellipsoid can be calculated:

$$L_a = \frac{1}{\sqrt{\lambda_1}}; L_b = \frac{1}{\sqrt{\lambda_2}}; L_c = \frac{1}{\sqrt{\lambda_3}}.$$

(6) Since the molten-state droplet is rotating in the suspended state and is formed into the shape of a rotating ellipsoid rotating around its own minor axis under the action of centrifugal force, the three semi-axes of the rotating ellipsoid are classified into two types according to the obtained ellipsoidal semi-axis lengths $L_a$, $L_b$, and $L_c$ by adopting, for example, a K-Means clustering algorithm among cluster analysis algorithms, one type being major semi-axis lengths of the rotating ellipsoid and the other type being minor semi-axis lengths of the rotating ellipsoid, and their mean values are calculated respectively to obtain a major semi-axis $L_1$ and minor semi-axis $L_2$ of the rotating ellipsoidal droplet, ultimately obtaining expression (6) for the volume of the suspended ellipsoidal droplet:

$$V = \frac{4\pi}{3} L_1^2 L_2.$$

In addition, in this embodiment, the mass of the droplet is measured twice before and after the experiment, and its mean mass value is calculated. The mean mass value is taken as the mass of the droplet, and then the density of the droplet is calculated according to the mass of the droplet and the volume of the droplets obtained as above. Thus, the influence of mass change caused by volatilization during the melting of the sample on a density measurement result can be decreased.

An example will be taken to further illustrate the present invention in detail below. It should also be understood that the following example is only used to further illustrate the present invention rather than to limit the protection scope of the present invention. All non-essential improvements and adjustments which are made by those skilled in the art according to the above contents of the present invention shall fall within the protection scope of the present invention. The specific technological parameters of the following example are merely one example in an appropriate range, that is, those skilled in the art can make choices within the appropriate range through the description herein, but the choices are not limited to the specific values of the following example.

EXAMPLE

A rotating ellipsoid (major axis: 4.2 mm; minor axis: 3.5 mm) in any posture and a standard sphere with a diameter of 5 mm were constructed respectively in a three-dimensional coordinate system by simulation software.

(1) The sphere was shot by using cameras, with the image solution being 512×512 pixels. According to the number of diameter pixels of standard sphere images and the diameter of the standard sphere, the actual size corresponding to each individual pixel of the camera images was calculated. In this example, the actual size corresponding to each individual pixel was calculated to be 0.0318 mm.

(2) Images of the ellipsoid were acquired by two cameras making an included angle α between them, so that images IM1 and IM2 were obtained. In this example, the included angle between the two cameras was 103.42°.

(3) An ellipsoidal quadric surface equation was established for the droplet by adopting a symmetric positive definite matrix A, and the center of each edge contour line was located at the coordinate center of a coordinate system of the corresponding image, so as to simplify the aforementioned ellipsoidal quadric surface equation.

Then, the Otsu method was adopted to calculate a threshold to binarize the images, the edges of the binarized images were detected by adopting the Sobel algorithm to obtain edge contour lines of the images, and elliptical contour line equations were established for the edge contour lines of the images IM1 and IM2, respectively. The images IM1 and IM2 were regarded respectively as sample images obtained by the two cameras shooting the ellipsoid along two x axes making an included angle of 103.42° between them, and according to the calibration results of the camera images in step (1), a coordinate set composed of actual coordinates of each point on the respective edge contour lines of the two images was extracted. Thus, the elliptical contour line equations for the aforementioned images IM1 and IM2 were rearranged and simplified.

Then the simplified elliptical contour line equations were estimated by adopting the least squares method to obtain an estimated value of each parameter in the elliptical contour line equations.

(4) The included angle α of 103.42° was introduced, and an equation set showing relationships between the parameters was constructed according to geometrical relationships between the two elliptical contour line equations and the ellipsoidal quadric surface equation.

(5) The aforementioned equation set was solved by adopting the iteration method to obtain an optimal solution of each parameter in the symmetric positive definite matrix A, and lengths of three semi-axes of the ellipsoid were calculated by solving eigenvalues of the positive definite matrix A.

(6) Since the droplet was the rotating ellipsoid, the three semi-axes were classified into two types by adopting the K-Means clustering algorithm, i.e., major semi-axes and minor semi-axes. The mean values of the major semi-axes and the minor semi-axes were taken as a major semi-axis $L_1$ and a minor semi-axis $L_2$ of the droplet respectively, and the volume of the ellipsoid was calculated by adopting the volume formula for the rotating ellipsoid.

For the comparison between the ellipsoid volume result calculated by the image processing algorithm of the present application and ellipsoid volume results not calculated by adopting the image processing algorithm of the present application, see the following table.

TABLE 1

| | Major Axis | Minor Axis | Volume | Deviation |
| --- | --- | --- | --- | --- |
| Actual droplet size | 2.1 | 1.75 | 32.33 | |
| Results measured by the present invention | 2.13 | 1.77 | 33.64 | 4.05% |
| Results measured only by adopting image IM1 | 2.1 | 2.025 | 37.41 | 15.71% |
| Results measured only by adopting image IM2 | 2.105 | 1.835 | 34.06 | 5.36% |

It can be seen from Table 1 that the maximum deviation of the calculated ellipsoid volumes not calculated by adopting the image processing algorithm of the present application is 15.71%, while the deviation of the volume calculated by adopting this algorithm is 4.05%. Therefore, the image processing algorithm of the present application can improve the reliability and accuracy of ellipsoid volume calculation.

The objective, technical solution and beneficial effects of the present invention have been further illustrated in detail by the above specific embodiment. It should be understood that the above is only a specific embodiment of the present invention rather than is intended to limit the protection scope of the present invention. Without departing from the basic characteristics of the present invention, the present invention can be embodied in various forms, so the embodiments of the present invention are intended for illustration rather than limitation. Since the scope of the present invention is defined by the claims rather than the specification, all changes that fall within the scope defined by the claims or equivalent scopes of the scope defined by the claims should be understood as being included in the claims. Any modifications, equivalent replacements, improvements and the like which are made within the spirit and principle of the present invention shall fall within the protection scope of the present invention.

What is claimed is:

1. A molten-state suspended ellipsoidal droplet image processing method based on dual-camera vision, comprising the following steps:
   (1) acquiring standard sphere images of a standard sphere by means of two cameras, and calculating the actual size corresponding to each individual pixel of the acquired standard sphere images of the two cameras;
   (2) synchronously acquiring two images of a droplet by using the two cameras making a specified included angle;
   (3) establishing an ellipsoidal quadric surface equation for the droplet, respectively detecting edge contour lines of the two images, and establishing elliptical contour line equations of the edge contour lines;
   (4) introducing the specified included angle, and constructing an equation set according to relationships between parameters of the two elliptical contour line equations and the ellipsoidal quadric surface equation;
   (5) solving the equation set, and calculating the length of each semi-axis of the droplet; and
   (6) calculating the volume of the droplet according to the length of each semi-axis, wherein step (3) further comprises:
   constructing the ellipsoidal quadric surface equation for the droplet by using a symmetric positive definite matrix;
   adopting the Otsu method to calculate a threshold to binarize each image, detecting an edge contour line of each image by the Sobel edge detection algorithm, and constructing an elliptical contour line equation for each edge contour line;
   regarding each image as an image on a respective y-z plane, and extracting a coordinate set of each point on each edge contour line; and
   obtaining an estimated value of each parameter in each elliptical contour line equation by adopting the least squares method, wherein the droplet is formed into the shape of a rotating ellipsoid; and in step (6), all the semi-axes are classified into first semi-axes and second semi-axes by using a cluster analysis algorithm, and respective mean values of the first semi-axes and the second semi-axes are calculated.

2. The method of claim 1, wherein
in step (3), after the detecting an edge contour line of each image, the center of each edge contour line is located at the center of the corresponding image.

3. The method of claim 1, wherein
in step (5), an optimal solution of each parameter in the equation set is obtained by adopting the iteration method, and the length of each semi-axis of the droplet is calculated by the symmetric positive definite matrix.

4. The method of claim 1, wherein
the droplet is measured respectively before and after steps (1) through (6) are performed, and a mean mass value is calculated and taken as the mass of the droplet; and
the density of the droplet is calculated according to the volume and mass of the droplet.

* * * * *